(12) United States Patent
Ossadnik

(10) Patent No.: US 10,731,711 B2
(45) Date of Patent: Aug. 4, 2020

(54) FRICTION CLUTCH

(71) Applicant: Schaeffler Technologies AG & Co. KG, Herzogenaurach (DE)

(72) Inventor: Thomas Ossadnik, Birkenwerder (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 61 days.

(21) Appl. No.: 15/781,285

(22) PCT Filed: Nov. 22, 2016

(86) PCT No.: PCT/DE2016/200532
§ 371 (c)(1),
(2) Date: Jun. 4, 2018

(87) PCT Pub. No.: WO2017/092746
PCT Pub. Date: Jun. 8, 2017

(65) Prior Publication Data
US 2018/0266494 A1  Sep. 20, 2018

(30) Foreign Application Priority Data

Dec. 2, 2015 (DE) .......... 10 2015 224 031

(51) Int. Cl.
*F16D 13/69* (2006.01)
*F16D 13/00* (2006.01)
(Continued)

(52) U.S. Cl.
CPC .......... *F16D 13/69* (2013.01); *F16D 13/00* (2013.01); *F16D 13/52* (2013.01); *F16D 13/64* (2013.01);
(Continued)

(58) Field of Classification Search
None
See application file for complete search history.

(56) References Cited

U.S. PATENT DOCUMENTS 5,553,695 A * 9/1996 Lutz ............... F16D 13/64
192/107 C
8,167,107 B2   5/2012 Schrader et al.
(Continued)

FOREIGN PATENT DOCUMENTS

DE  102008032458  2/2009
DE  102012013171  1/2014
(Continued)

*Primary Examiner* — Colby M Hansen
(74) *Attorney, Agent, or Firm* — Volpe and Koenig, P.C.

(57) ABSTRACT

A friction clutch having at least one clutch part (1; 31) which has at least one friction lining (3; 33) with a friction surface (10; 40) which, when the friction clutch is closed, is connected in frictionally engaging fashion to a counterpart clutch part, wherein the friction lining (3; 33) and/or a carrier element (6) of the friction lining (3; 33) is, in a circumferential direction, of undulating shape with wave troughs (20) and wave crests (18, 19), wherein, when the friction clutch is open, the friction lining (3; 33) comes into contact with the counterpart clutch part not with the entire friction surface (10; 40) but only substantially in punctiform fashion in the area of peaks (15-17) of the wave crests (18, 19). The friction lining (3; 33) has reduced friction values locally in the region of the peaks (15-17) of the wave crests (18, 19) in relation to the friction surface (10; 40) surrounding the peaks (15-17) of the wave crests (18, 19).

20 Claims, 1 Drawing Sheet

(51) Int. Cl.
*F16D 13/64* (2006.01)
*F16D 13/52* (2006.01)
*F16D 69/00* (2006.01)

(52) U.S. Cl.
CPC .... *F16D 2069/004* (2013.01); *F16D 2300/10* (2013.01)

(56) References Cited

U.S. PATENT DOCUMENTS

| | | | | |
|---|---|---|---|---|
| 8,919,518 | B2* | 12/2014 | Diemer | F16D 13/52 192/70.28 |
| 9,841,065 | B2* | 12/2017 | Okamura | F16D 13/74 |
| 2015/0275598 | A1 | 10/2015 | Okamura | |
| 2015/0275985 | A1* | 10/2015 | Okamura | F16D 13/74 192/113.36 |

FOREIGN PATENT DOCUMENTS

| | | |
|---|---|---|
| DE | 102012018002 | 3/2014 |
| JP | H09257058 | 9/1997 |
| JP | 2001234946 | 8/2001 |
| JP | 2009052601 | 3/2009 |
| JP | 2013124747 | 6/2013 |

* cited by examiner

FRICTION CLUTCH

BACKGROUND

The invention relates to friction clutch with at least one clutch part that has at least one friction lining with a friction surface that is connected to a counterpart clutch part with a frictional connection when the friction clutch is closed, wherein the friction lining and/or a carrier element of the friction lining is constructed with an undulating shape in a circumferential direction with wave troughs and wave crests, wherein, when the friction clutch is open, the friction lining is not in contact with the entire friction surface, but instead is in contact with the counterpart clutch part essentially only in a point-wise manner in the area of the peaks of the wave crests.

From the German published patent application DE 10 2008 032 458 A1, a wet clutch is known with at least two friction surfaces that can be brought into friction contact with each other, wherein at least one friction surface is formed by the surface of an annular friction lining applied to a carrier part with an inner and an outer circumference and a specified thickness that has an essentially planar friction surface and a specified porosity, wherein the friction lining has at least one cutout reducing the surface and extending over the entire thickness of the friction lining.

SUMMARY

The object of the invention is to improve a friction clutch with at least one clutch part that has at least one friction lining with a friction surface that is connected to a counterpart clutch part with a frictional connection when the friction clutch is closed, wherein the friction lining and/or a carrier element of the friction lining is constructed with an undulating shape in a circumferential direction with wave troughs and wave crests, wherein, when the friction clutch is open, the friction lining is not in contact with the entire friction surface, but instead is in contact with the counterpart clutch part essentially only in a point-wise manner in the area of peaks of the wave crests, especially with respect to a drag torque when the friction clutch is in operation.

The objective is achieved with a friction clutch with at least one clutch part that has at least one friction lining with a friction surface that is connected to a counterpart clutch part with a frictional connection when the friction clutch is closed, wherein the friction lining and/or a carrier element of the friction lining is constructed with an undulating shape in a circumferential direction with wave troughs and wave crests, wherein, when the friction clutch is open, the friction lining is not in contact with the entire friction surface, but instead is in contact with the counterpart clutch part essentially only in a point-wise manner in the area of peaks of the wave crests, such that the friction lining has reduced coefficients of friction locally in the area of the peaks of the wave crests compared with the friction surface surrounding the peaks of the wave crests. The clutch part with the friction lining is also called a friction part. The friction part is preferably a friction disk of a friction clutch constructed as a multiple-disk clutch. The carrier element is preferably a carrier plate. The friction disk or the carrier plate of the friction disk is slightly corrugated. The counterpart clutch part is, for example, a steel disk. Due to the reduced coefficients of friction in the area of the peaks of the wave crests, the friction lining is optimized at the contact points with the adjacent steel disks. The contact points to the friction disks are always the peaks of the wave, because, in the open state of the friction clutch, the friction lining slides along the adjacent steel disks only in these locations. In this respect it is proposed to optimize the friction lining at exactly these locations, so that it generates the lowest possible friction. Normally, rather high coefficients of friction are required to be able to achieve high torques with low contact forces. In contrast to the normally prevailing opinion, in the present case, especially low coefficients of friction are the goal—at least locally at the peaks. The reduced coefficients of friction in the area of the peaks of the wave crests can be achieved in various ways.

One preferred embodiment of the friction clutch is characterized in that the friction lining has a smaller outer radius in the area of the peaks of the wave crests, in order to reduce the friction in the area of the peaks of the wave crests. Due to the smaller outer radius, the friction surface in the area of the peaks of the wave crests can be reduced in a simple way.

Another preferred embodiment of the friction clutch is characterized in that the friction lining has a greater inner radius in the area of the peaks of the wave crests, in order to reduce the friction in the area of the peaks of the wave crests. Due to the greater inner radius, the friction surface in the area of the peaks of the wave crests can be reduced in a simple way. According to another aspect, the friction lining has both a smaller outer radius and also a larger inner radius in the area of the peaks of the wave crests.

Another preferred embodiment of the friction clutch is characterized in that the friction lining is provided in the area of the peaks of the wave crests with more grooves, in order to reduce the friction in the area of the peaks of the wave crests. By increasing the number of grooves in the area of the peaks of the wave crests, the friction surface can be reduced in a simple way.

Another preferred embodiment of the friction clutch is characterized in that the friction lining is provided in the area of the peaks of the wave crests with larger grooves, in order to reduce the friction in the area of the peaks of the wave crests. Due to the larger grooves, the friction surface in the area of the peaks of the wave crests can be reduced in a simple way. According to another aspect, the friction lining in the area of the peaks of the wave crests is provided both with more grooves and also with larger grooves.

Another preferred embodiment of the friction clutch is characterized in that the friction lining has, in the area of each of the peaks of the wave crests, at least one lateral contraction, in order to reduce the friction in the area of the peaks of the wave crests. Due to the lateral contraction, a soft transition from areas with larger outer radius/smaller inner radius to an area with a smaller outer radius/larger inner radius is produced in the area of a peak of a wave crest.

Another preferred embodiment of the friction clutch is characterized in that the friction lining is formed from friction lining pieces, wherein, in the area of the peaks of the wave crests, there are fewer friction lining pieces, in order to reduce the friction in the area of the peaks of the wave crests. In this way, the friction surface in the area of the peaks of the wave crests can be reduced in a simple way.

Another preferred embodiment of the friction clutch is characterized in that the friction lining is formed from friction lining pieces, wherein, in the area of the peaks of the wave crests, there are smaller friction lining pieces, in order to reduce the friction in the area of the peaks of the wave crests. Due to the smaller friction lining pieces, the friction surface in the area of the peaks of the wave crests can be reduced in a simple way.

Another preferred embodiment of the friction clutch is characterized in that the friction surface has essentially the shape of a circular ring disk, wherein the friction lining or the friction lining pieces forming the friction surface are mounted on a corrugated carrier plate. Due to the corrugated carrier plate, a spring pretensioning is formed in a simple way, by which the clutch is opened or held open. Depending on the construction of the friction lining, the circular ring disk-shaped friction surface is continuous or partitioned to a greater or lesser degree. The mounting of the friction lining or the friction lining pieces on the carrier plate is preferably realized with a substance connection, for example, by bonding, and/or by rivet connecting elements.

The invention further relates to a clutch part, a friction lining, and/or a friction lining piece for a friction clutch described above. The specified parts can be treated separately.

BRIEF DESCRIPTION OF THE DRAWINGS

Additional advantages, features, and details of the invention are given from the following description in which, with reference to the drawing, different embodiments are described in detail. Shown are.

DETAILED DESCRIPTION

Figure 1:
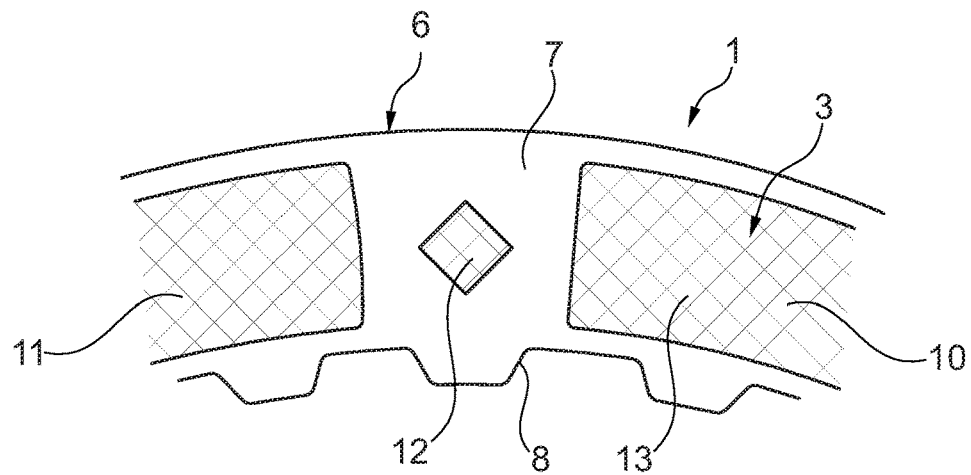
FIG. 1 a section of a clutch part in a top view of a friction lining that is formed from friction lining pieces.
Figure 2:
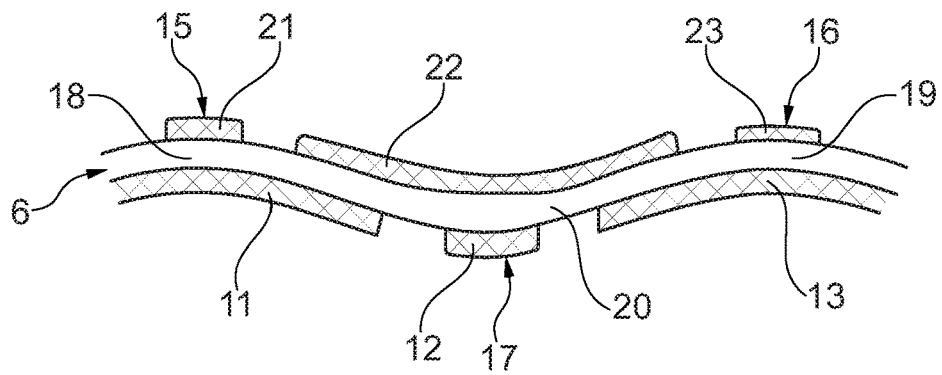
FIG. 2 a view of the clutch part from FIG. 1 from above.

In FIGS. 1 and 2, a clutch part 1 with a friction lining 3 is shown in different views. The friction lining 3 is mounted on a carrier element 6 at least with a substance connection, for example, by bonding. The carrier element 6 is preferably constructed as a carrier plate and has the shape of a circular ring disk 7.

The carrier element 6 has, on the radial inside, internal teeth 8 that are used for forming a rotationally locked connection to a disk carrier of a clutch, in particular, a multiple disk clutch. The friction lining 3 on the carrier element 6 is used for forming a friction surface 10.

The friction surface 10 comes into contact with steel disks in a friction clutch, in particular, a multiple disk clutch. When the friction clutch is closed, multiple friction surfaces 10 are connected to steel disks in a frictional connection, in order to transfer a torque.

Friction lining pieces 11, 12, 13; 21, 22, 23 are mounted on the carrier element 6, as can be seen in FIG. 2, on both sides. The carrier element 6 has a corrugated construction for forming a spring pretensioning of the clutch part 1. Due to the corrugation of the carrier element 6, wave crests 18, 19 are created, between which there are wave troughs 20.

The wave trough 20 also forms, when viewed from below in FIG. 2, a wave crest. Therefore, the extreme points of the wave crests 18, 19 and the wave trough 20 are all designated as peaks 15, 16, 17. Here, it is taken into account that the peak 17 is a low point.

The carrier element 6 can rotate about a rotational axis with the circular ring disk 7 when the friction clutch is in operation. The term axial refers to this rotational axis of the carrier element 6 with the friction lining 3. Axial means in the direction of or parallel to the rotational axis. Analogously, radial means perpendicular to the rotational axis.

Due to the corrugation of the carrier element 6 with the wave crests 18, 19 and the wave trough 20, the clutch part 1 can be compressed elastically in the axial direction with the friction lining pieces 11 to 13, 21 to 23.

The clutch constructed as a friction clutch, in particular, as a multiple disk clutch, is preferably a wet-running clutch. Wet-running means that the individual clutch parts 1 and counterpart clutch parts come in contact with a lubricating and/or cooling medium, such as oil, when the clutch is in operation.

When the clutch is open, drag torques occur between the clutch parts 1 and the counterpart clutch parts, in particular, the steel disks, due to the viscous friction of the oil. Especially at low temperatures, the viscosity of the oil is particularly high, so that the drag torques are also very high. These drag torques can be significantly reduced by an advantageous construction of the friction lining 3, especially by an orientation of the friction lining pieces 12, 21, 23 in the circumferential direction.

The clutch part 1 is optimized at the peaks 15, 16, 17 of the corrugation of the carrier element 6 so that the lowest possible friction occurs there when the clutch part 1 is in operation. For this purpose, in the clutch part 1 shown in FIGS. 1 and 2, significantly smaller friction lining pieces 17, 21, 23 are arranged in the area of the peaks 15 to 17. The friction lining pieces 11, 13, 22 have significantly larger constructions compared with the friction lining pieces 17, 21, 23.

Figure 3:
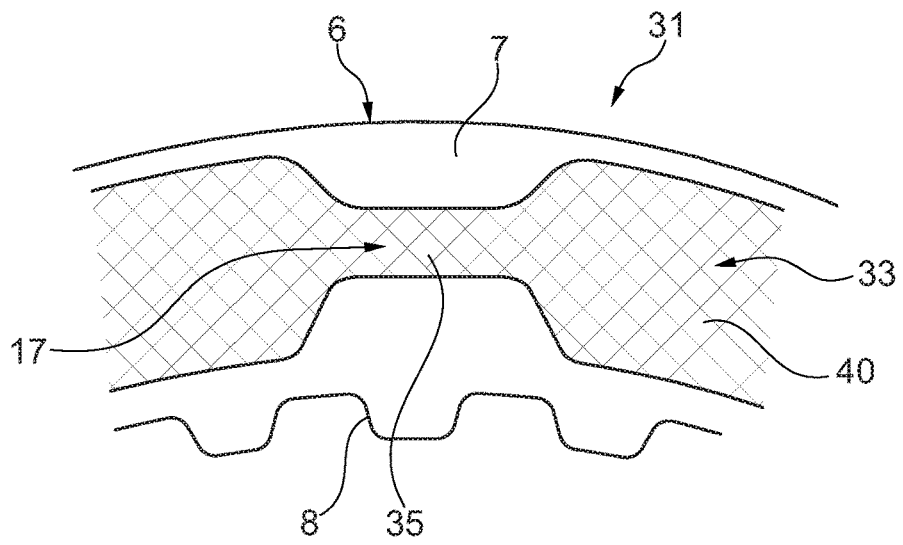
FIG. 3 a clutch part similar to that in FIG. 1 with a friction lining that is formed from one piece and has a lateral contraction.

In FIG. 3, a clutch part 31 with a one-piece friction lining 33 is shown. The one-piece friction lining 33 is provided with a lateral contraction 35 in the area of the peak or low point 17. Due to the lateral contraction 35, the friction surface 40 in the area of the peak 17 is reduced in a simple way. A friction surface 40 of the friction lining 33 has, outside of the lateral contraction 35, a larger outer diameter and a smaller inner diameter than in the area of the lateral contraction 35.

LIST OF REFERENCE SYMBOLS

1 Clutch part
3 Friction lining
6 Carrier element
7 Circular ring disk
8 Internal teeth
10 Friction surface
11 Friction lining piece
12 Friction lining piece
13 Friction lining piece
15 Peak
16 Peak
17 Peak
18 Wave crest
19 Wave crest
20 Wave trough
21 Friction lining piece
22 Friction lining piece
23 Friction lining piece
31 Clutch part
33 Friction lining
35 Lateral contraction
40 Friction surface

The invention claimed is:
1. A friction clutch comprising:
at least one clutch part and a counterpart clutch part, the
at least one clutch part has a friction lining with a friction surface that is connected to the counterpart clutch part with a frictional connection when the fric- tion clutch is closed, the friction lining having a one-piece, continuous construction;

a carrier element for the friction lining, at least one of the friction lining or the carrier element is constructed with an undulating shape in a circumferential direction with wave troughs and wave crests such that when the friction clutch is open, the friction lining is in contact with the counterpart clutch part only in an area of peaks of the wave crests; and the friction lining has reduced coefficients of friction locally in the area of the peaks of the wave crests relative to the friction surface surrounding the peaks of the wave crests.

2. The friction clutch according to claim 1, wherein the friction lining in the area of the peaks of the wave crests has a smaller outer radius than in areas outside the peaks to reduce the friction in the area of the peaks of the wave crests.

3. The friction clutch according to claim 1, wherein the friction lining in the area of the peaks of the wave crests has a greater inner radius than in areas outside the peaks to reduce the friction in the area of the peaks of the wave crests.

4. The friction clutch according to claim 1, wherein the friction lining includes more grooves in the area of the peaks of the wave crests than in areas outside the peaks to reduce the friction in the area of the peaks of the wave crests.

5. The friction clutch according to claim 1, wherein the friction lining is provided with larger grooves in the area of the peaks of the wave crests than in areas outside the peaks to reduce the friction in the area of the peaks of the wave crests.

6. The friction clutch according to claim 1, wherein the friction lining in the area of the peaks of the wave crests has at least one lateral contraction to reduce the friction in the area of the peaks of the wave crests.

7. The friction clutch according to claim 1, wherein the friction lining is formed from friction lining pieces, and in the area of the peaks of the wave crests there are fewer friction lining pieces than in the wave troughs, reducing the friction in the area of the peaks of the wave crests.

8. The friction clutch according to claim 1, wherein the friction lining is formed from friction lining pieces, and in the area of the peaks of the wave crests, there are smaller friction lining pieces than in the wave troughs, reducing the friction in the area of the peaks of the wave crests.

9. The friction clutch according to claim 1, wherein the friction surface has the shape of a circular ring disk, and the friction lining or friction lining pieces that form the friction lining are mounted on a corrugated carrier plate as the carrier element.

10. A clutch part for a friction clutch, the clutch part comprising:

a friction lining attached to a carrier element, the friction lining including a friction surface having wave crests and wave troughs, the friction lining having a one-piece, continuous construction, and the friction surface has a reduced coefficient of friction locally in an area of peaks of the wave crests relative to the friction surface surrounding the peaks of the wave crests.

11. A clutch part for a friction clutch, the clutch part comprising:

a friction lining, the friction lining including a friction surface arranged to contact a counterpart clutch part to provide a frictional connection when the friction clutch is closed, the friction lining having a one-piece, continuous construction;

a carrier element for the friction lining, at least one of the friction lining or the carrier element is constructed with an undulating shape in a circumferential direction with wave troughs and wave crests such that when the friction clutch is open, the friction lining is arranged to contact the counterpart clutch part only in an area of peaks of the wave crests; and the friction lining has a reduced coefficient of friction locally in the area of the peaks relative to the friction surface surrounding the peaks.

12. The clutch part according to claim 11, wherein the friction lining has a smaller outer radius in the area of the peaks than in areas outside of the peaks.

13. The clutch part according to claim 11, wherein the friction lining has a greater inner radius in the area of the peaks than in areas outside of the peaks.

14. The clutch part according to claim 11, wherein the friction lining has grooves in the area of the peaks in order to reduce a contact area that is adapted to contact the counterpart clutch part.

15. The clutch part according to claim 11, wherein the friction lining has more grooves in the area of the peaks than in areas outside of the peaks.

16. The clutch part according to claim 11, wherein the friction lining has at least one lateral contraction in the area of the peaks.

17. The clutch part according to claim 11, wherein the friction lining is formed from friction lining pieces, and there are fewer friction lining pieces in the area of the peaks than in an area of the wave troughs.

18. The clutch part according to claim 11, wherein the friction lining is formed from friction lining pieces, and the friction lining pieces in the area of the peaks are smaller than in an area of the wave troughs.

19. The clutch part according to claim 11, wherein the carrier element comprises a corrugated carrier plate.

20. A friction clutch comprising the clutch part according to claim 11 and a counterpart clutch part.

* * * * *